US009009149B2

(12) United States Patent
He et al.

(10) Patent No.: US 9,009,149 B2
(45) Date of Patent: Apr. 14, 2015

(54) SYSTEMS AND METHODS FOR MOBILE SEARCH USING BAG OF HASH BITS AND BOUNDARY RERANKING

(71) Applicant: The Trustees of Columbia University in the City of New York, New York, NY (US)

(72) Inventors: Junfeng He, New York, NY (US); Shih-Fu Chang, New York, NY (US); Tai-Hsu Lin, Kaohsiung (TW)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 13/707,251

(22) Filed: Dec. 6, 2012

(65) Prior Publication Data
US 2013/0254191 A1  Sep. 26, 2013

Related U.S. Application Data

(60) Provisional application No. 61/567,565, filed on Dec. 6, 2011.

(51) Int. Cl.
*G06F 17/30* (2006.01)
*G06K 9/46* (2006.01)

(52) U.S. Cl.
CPC ...... *G06F 17/3053* (2013.01); *G06F 17/30247* (2013.01); *G06K 9/4676* (2013.01)

(58) Field of Classification Search
CPC ............ G06F 17/30657; G06F 17/30867; G06F 17/30247; G06F 17/30244; G06F 17/30265; G06F 17/30598; G06F 17/30256; G06F 17/30259; G06F 17/30424; G06F 17/30442; G06F 17/3071; G06F 17/30876; G06F 17/2745; G06F 17/30241; G06F 17/3053; G06F 9/4676; G06F 17/30
USPC .......... 707/728, 747, 748, 713, 759, E17.052, 707/E17.014; 382/100, 224, 162, 165, 199, 382/282, 295, 453, 538, 305; 713/176, 180; 725/142, 19
See application file for complete search history.

(56) References Cited

U.S. PATENT DOCUMENTS 6,282,300 B1 *  8/2001  Bloom et al. ................. 382/100
7,827,218 B1 * 11/2010  Mittal ........................... 707/899

(Continued)

OTHER PUBLICATIONS

Junfeng He; Tai-Hsu Lin; Jinyuan Feng; and Shih-Fu Chang—Mobile product search with bag of hash bits—Proceeding MM '11 Proceedings of the 19th ACM international conference on Multimedia Nov. 28-Dec. 1, 2011—pp. 839-840.*

(Continued)

*Primary Examiner* — Anh Ly
(74) *Attorney, Agent, or Firm* — Baker Botts, LLP (57) ABSTRACT

Determining ranked candidate media in response to media query data corresponding to a query media includes receiving the media query data including feature data of the query media, coordinate data, and boundary data, matching the features with corresponding features of an media database using the feature data to identify features in the media database within a predetermined hamming distance in a hash table from the corresponding features of the query media to obtain matched features in the media database, determining candidate media whose number of matched features exceeds a matched feature threshold, generating a geometry similarity score between the query media and each candidate media using the feature data and the coordinate data, generating a boundary similarity score between the query media and each candidate media using the boundary data, ranking the candidate media based on the numbers of matched features, the geometry similarity scores and the boundary similarity scores.

25 Claims, 8 Drawing Sheets

(56) References Cited

U.S. PATENT DOCUMENTS

| | | | |
|---|---|---|---|
| 8,520,949 B1* | 8/2013 | Bissacco et al. | 382/190 |
| 8,571,255 B2* | 10/2013 | Bauer et al. | 382/100 |
| 2002/0124104 A1* | 9/2002 | Rappaport et al. | 709/238 |
| 2007/0047816 A1* | 3/2007 | Graham et al. | 382/181 |
| 2007/0115982 A1* | 5/2007 | Pope et al. | 370/392 |
| 2007/0165904 A1* | 7/2007 | Nudd et al. | 382/100 |
| 2007/0217676 A1* | 9/2007 | Grauman et al. | 382/170 |
| 2008/0082426 A1* | 4/2008 | Gokturk et al. | 705/27 |
| 2009/0041049 A1* | 2/2009 | Scott et al. | 370/419 |
| 2009/0307184 A1* | 12/2009 | Inouye et al. | 707/2 |
| 2010/0008589 A1 | 1/2010 | Bober et al. | |
| 2010/0205509 A1* | 8/2010 | Kirschner et al. | 714/773 |
| 2010/0332210 A1* | 12/2010 | Birdwell et al. | 707/797 |
| 2011/0004599 A1 | 1/2011 | Deninger et al. | |
| 2011/0081892 A1* | 4/2011 | Graham et al. | 455/413 |
| 2011/0162062 A1* | 6/2011 | Kumar et al. | 726/15 |
| 2011/0238698 A1* | 9/2011 | Asikainen et al. | 707/780 |
| 2011/0268315 A1* | 11/2011 | Bauer et al. | 382/100 |
| 2011/0283111 A1* | 11/2011 | Bister et al. | 713/185 |
| 2011/0299721 A1* | 12/2011 | He et al. | 382/100 |
| 2012/0011128 A1* | 1/2012 | He et al. | 707/747 |
| 2012/0109858 A1* | 5/2012 | Makadia et al. | 707/728 |
| 2012/0114167 A1* | 5/2012 | Tian et al. | 382/100 |
| 2012/0215789 A1* | 8/2012 | Ramanathan et al. | 707/747 |
| 2014/0064091 A1* | 3/2014 | Basso et al. | 370/235.1 |

OTHER PUBLICATIONS

S Baluja, and M Covell—"Learning"Forgiving" Hash Functions: Algorithms and Large Scale Tests"—IJCAI, 2007—aaai.org—IJCAI—2007—pp. 2663-2669.*

* cited by examiner

SYSTEMS AND METHODS FOR MOBILE SEARCH USING BAG OF HASH BITS AND BOUNDARY RERANKING

CROSS-REFERENCE TO RELATED APPLICATIONS

This application claims priority to U.S. Provisional Patent Application Ser. No. 61/567,565, filed on Dec. 6, 2011, which is incorporated by reference herein in its entirety.

BACKGROUND

The disclosed subject matter relates to systems and methods for mobile search, including mobile product search using Bag of Hash Bits (BoHB) and boundary reranking.

Mobile devices, including smartphones, can perform various types of mobile visual search, including location search, product search, augmented reality and the like. Among these, mobile product search can be utilized to identify products for sale based on a query image. For mobile product search, a local feature (LF) detector, like Scale-Invariant Feature Transform (SIFT) or Speeded Up Robust Feature (SURF) can be suitable, at least in part because some global feature detectors can be unable to perform object-level matching, which can be useful for product search.

Similar to conventional desktop visual searching, mobile visual search can benefit from efficient indexing and fast searching. Mobile visual search can also provide additional challenges, such as reducing the amount of data sent from the mobile device to the server, as well as utilizing relatively low computation and cheap memory on the mobile device.

Certain mobile visual search systems can use the mobile device only to perform capture and display. As such, the mobile device can send the query image in a compressed format, like JPEG, to the server, and additional processing, like local feature extraction and searching, can be performed by the server. As the computation capacity of smartphones increases, extracting local features on the mobile device can be performed at a suitable speed. As such, certain other mobile visual search systems can extract local features on the mobile device. Further, such local features can be compressed before transmission; otherwise, the raw local feature data can be greater than the query image data. If local features are compressed, for example, to tens of bits, and the compressed bits are sent to the server, the transmission cost and time can be reduced compared to sending the PEG images.

One approach to compressing local features can be to quantize each local feature to a visual word on the mobile side, and then send the visual words to the server. However, certain quantization methods, including quantization methods having a relatively large vocabulary, such as vocabulary tree, which can be utilized for improved search results, can be unsuitable for mobile devices due at least in part to the relatively low memory and computation capacity of mobile devices.

Another approach to mobile visual searching can be to compress the local features on the mobile side by some coding technique, such as Compressed Histogram of Gradients (CHoG), in which the raw features can be encoded using an entropy-based coding method, and can be decoded to approximately recover features at the server. The server can then quantize the recovered features to visual codewords and following a model, such as "bag of words" (BoW), can represent one image as collections of visual words contained in the image.

SUMMARY

Systems and methods for mobile search, including a mobile product search are disclosed herein.

The disclosed subject matter provides techniques for determining ranked candidate media in response to media query data generated at a mobile client device corresponding to a query media. In an exemplary embodiment, a technique for determining ranked candidate media in response to media query data generated at a mobile client device includes receiving the media query data from the mobile client device. The media query data can include feature data of one or more features of the query media encoded by a similarity preserving hashing function, as well as coordinate data for each of the one or more features, and boundary data. The technique also includes matching the features with corresponding features of an media database using the feature data to identify features of the query media within a predetermined hamming distance in a hash table from the corresponding features of the media database, to thus obtain one or more matched features in the media database. Further, the technique can include determining candidate media whose number of matched features exceeds a matched feature threshold, generating a geometry similarity score between the query media and each of the candidate media using the feature data and the coordinate data, generating a boundary similarity score between the query media and each of the candidate media using the boundary data, ranking the candidate media, and sending the ranked candidate media to the mobile client device. The ranking can be based on the numbers of matched features, the geometry similarity scores and/or the boundary similarity scores.

In some embodiments, the media query data can include boundary data. The technique can further include generating a boundary similarity score between the query media and each of the one or more candidate media using the boundary data, and ranking the one or more candidate media can be further based on the boundary similarity score. The query media can include a query media.

The similarity preserving hashing function can include a linear hashing function. Additionally or alternatively, the similarity preserving hashing function can include a nonlinear hashing function. The feature data can include hash bits for each feature encoded by the hash function. In some embodiments, the hash bits can be limited to less than 100 bits.

In some embodiments, the hash tables can include multiple entries, and the features of the query media and the features of the media database can each be assigned to one of the entries using the hash bits as table indexes. Matching the features can include identifying table entries within the predetermined hamming distance from the entries containing the features of the query media.

In some embodiments, the technique can further include obtaining subgroups of the hash bits of each feature data, utilizing each of the subgroups to create the hash tables, and assigning the feature data to an entry of a corresponding hash table.

In some embodiments, generating the geometry similarity score can include determining a length ratio between the one or more features of the query media and corresponding matched features of the candidate media using the coordinate data.

In some embodiments, generating the boundary similarity score can include, for each media of the query media and the candidate media, sampling a plurality of points along the boundary of the media, determining a distance between each sampled point and the center of the media to obtain boundary distance data, and applying a Fourier transform to the boundary distance data to obtain frequency magnitudes. Generating the boundary similarity score can further include comparing the frequency magnitudes of the query media with the frequency magnitudes of the candidate media.

In some embodiments, ranking the one or more candidate media can include ranking the candidate media by the number of matched features, for each of the one or more candidate media, combining the geometry similarity score and the boundary similarity score, and reranking the candidate media using the combined score.

DETAILED DESCRIPTION

One aspect of the disclosed subject matter relates to systems and methods for a mobile search using a Bag of Hash Bits (BoHB) technique. The disclosed subject matter can be used, for example, for performing a mobile product search using a mobile device. The disclosed subject matter can be utilized with various forms of media, for example and without limitation, images, audio and/or video. For purpose of illustration and not limitation, some embodiments of the disclosed subject matter described herein refer to images as a form of media.

Figure 1:
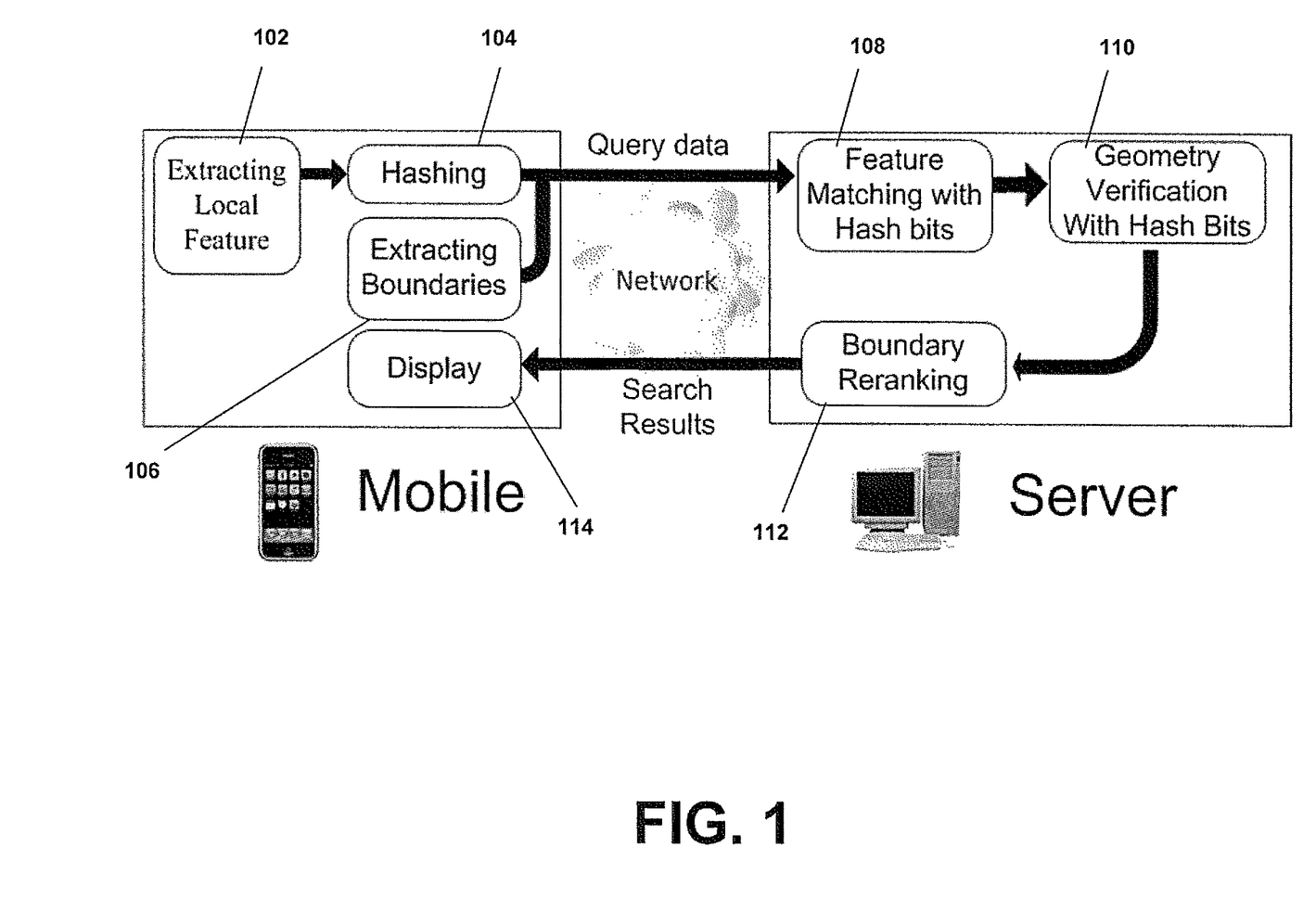
FIG. 1 is a diagram illustrating an exemplary technique for mobile product search according to the disclosed subject matter.

FIG. 1 is a block diagram illustrating an exemplary technique for performing a mobile search using BoHB and boundary reranking. At 102, local feature extraction can be performed, for example using a Speeded Up Robust Feature (SURF), which can have suitable accuracy and speed at local feature detection. At 104, database indexing can be performed, for example by encoding each local feature in a database into M bits by using similarity preserving hashing functions. Multiple hash tables can be built, each of which can use a subset k of the M bits.

To improve online searching, on the mobile device, each local feature in the query image can be compressed to M bits by the same similarity preserving hashing function. At 106, the (x, y) coordinates of each local feature can also be encoded, using less than 10 extra bits, in order to use the spatial layout information for reranking. The query data, including the hash bits (M bits) and the coordinate bits (less than 10 bits) for all the local features, together with the boundary curve of the whole object can be sent to the server. The query data can include as few as one boundary curve, which can be relatively compact, for example less than 200 bytes, and as such can cost relatively little transmission resources to include.

At 108, for a local feature in the query image and a local feature in the database, if they can be placed into two groups that are within a Hamming distance r in any hash table, the database local feature can be considered a "matched" feature for the query local feature. All matched local features for each query local feature can be found by examining all groups within hamming distance r in all hash tables. In this manner, candidate images whose "matched" local features exceed a certain threshold can then be obtained.

At 110, an image-level geometry verification can then be applied to compute the geometry similarity scores between the query image and candidate images. The geometry verification can utilize both the hash bits and the locations of local features in the image.

At 112, object boundary features can be integrated into the reranking stage. As such, the candidate images can be reranked, for example by combining the geometry similarity score and the boundary similarity score, and the final top K retrieved images can be returned. At 114, the final top K retrieved images can be displayed on the mobile device.

The bag of hash bit (BoHB) approach can utilize similar bit resource budgets as other approaches, for example on the order of 60-100 bits per local feature, but can provide improved search accuracy and search speed as shown in the experiments. For example, as shown in the experiments over a large dataset of product images, compared to CHoG, BoHB can obtain similar accuracy, in terms of recall for top K results, but improved speed on the order of tens of times in the search procedure, or in some measurements, can perform significantly better in both search accuracy (on the order of a 30% improvement) and search time (on the order of several times improvement). The BoHB technique also improves performance compared to other visual search systems, such as bag of words via vocabulary tree or product quantization. Moreover, hashing-based techniques can be relatively fast to compute, for example computing as few as tens of inner products, and can be implemented on mobile devices and applicable for different types of local features, hashing algorithms and image databases.

Moreover, from the boundary curve, a boundary feature, referred to herein as "central distance," can be considered translation, scale and rotation invariant to boundary changes. By incorporating the boundary feature into reranking, the overall search performance can be further improved, including in retrieving products of the same categories (e.g., shoe, furniture, etc.).

As discussed above, with reference to 102, linear hashing can be applied to encode each local features to hash bits. In an exemplary embodiment, for any local feature x, where x is a 128 dimension vector when using SURF, one hash bit for x can be obtained by $$b = \text{sign}(v^T x - t) \tag{1}$$

where v can represent a projection vector in the feature space, and t can represent a threshold scalar. Though v can be a projection vector from any linear similarity preserving hashing method, in some embodiments, v can be randomly generated. Additionally or alternatively, v can be a projection vector from compact hashing, such as principal component analysis (PCA) hashing or similarity preserving independent component analysis (SPICA) hashing. As referred to herein, v can be considered to be a PCA or SPICA projection vector. Additionally or alternatively, a balancing hash bit can improve the search performance. As such, t can be chosen as a median value such that half of each bit can be +1, and the half of each bit can be −1.

In some embodiments, the number of hash bits for each local feature can be limited, for example to less than 100, to achieve a desired transmission speed.

As discussed above, with reference to 108, for one local feature in the query image, corresponding "matched" local features in the database, for example nearest neighbor local features in the database, can be obtained. In one example, an exemplary database can include a product data sets including 300,000-400,000 images. Furthermore, each image can have about 100-200 local features on average. As such, the exemplary database can include 30 million or more local features. To find matched local features for all local features in the query image, the exemplary 30 million or more local features can be searched for hundreds of times. In this manner, by applying linear scan to search for matched local features, the computation can consume a relatively large amount of computational resources, even with tens of bits for each local feature. Accordingly, to achieve improved sublinear search results compared to linear scan, multiple hash tables can be utilized.

For one hash bit/function, $p_{NN}$ can represent the probability of one query point (i.e., a local feature) and one of its neighbor points having the same bit value, and $p_{any}$ can represent the probability of one query point and a random database point having the same bit value. When using similarity preserving hash functions, $p_{NN}$ can be larger than $p_{any}$. A number k bits of the total M bits can be used in one table.

For purpose of simplicity of illustration and not limitation, as discussed herein, $p_{NN}$ and $p_{any}$ can be considered to be the same for every bit, and bits can be considered to be independent. $P_{NN}(k, r)$ can represent the probability of one query point and one of its nearest neighbors to fall into two groups whose hamming distance is no larger than r, where r<<k. Thus, $$P_{NN}(k, r) = \sum_{i=0,\ldots r} C_k^i (p_{NN})^{k-i}(1 - p_{NN})^i \quad (2)$$

Similarly, $P_{any}(k, r)$ can represent the probability of one query point and a random database point to fall into two groups whose hamming distance is no larger to r. Similarly, $$P_{any}(k, r) = \sum_{i=0,\ldots r} C_k^i (p_{any})^{k-i}(1 - p_{any})^i \quad (3)$$

$p_{any} < p_{NN}$ and r<<k, so $P_{any}(k, r)$ can decrease much faster than $P_{NN}(k, r)$ when k increases. Furthermore, the expected number of returned nearest neighbors can be represented as $N_{NN} P_{NN}(k, r)$, where $N_{NN}$ can represent the number of total nearest neighbor points for the query point. Moreover, the expected number of all returned points can be represented as $NP_{any}(k, r)$, where N can represent the number of points in the database. As such, the precision of nearest neighbors in returned points can be represented as $$\frac{N_{NN} P_{NN}(k, r)}{NP_{any}(k, r)}, \quad (4)$$

If k becomes larger, $$\frac{N_{NN} * P_{NN}(k, r)}{N * P_{any}(k, r)},$$

can also become larger, and thus the precision of finding matched local features can be high. However, when k is large, $N_{NN}*P_{NN}(k, r)$ can decreases such that enough nearest neighbors can not be obtained. As such, the number of hash tables L can be increased to improve the chance of obtaining nearest neighbors, while still maintaining high precision.

If one group (i.e., r=0) can be checked in each hash table, L can be relatively large, for example on the order of hundreds of hash tables, to obtain a suitable recall for finding nearest neighbors. As such, to reduce the number of tables, multiple groups can be examined in one hash table. For example, r can be set to 2 or 3, and all groups within hamming distance r in each hash table, can be checked. In this manner, the number of needed tables can then be reduced, for example to about ten, due at least in part to the increase of $P_{NN}(k, r)$ when r becomes larger, for a fixed k.

Hamming distance r can be a relatively small number, for example 3 or less, and as such, the number of bits k in each hash table can about 20-40, and L can be about 5-20.

Multi hashing tables can be used to find nearest neighbor local features for the query features. However, the number of bits to build L hash tables can be represented as Lk, and thus can be hundreds or thousands bits. For mobile visual search, a budget of tens of bits per local feature can improve performance. As such, rather than sending hundreds or thousands of hash bits for each local feature over the mobile network, tens of bits per local feature can be sent, and multiple hash tables can be generated by reusing the bits. That is, M bits for each local feature can be provided, and each hash table can be built by randomly choosing a subset of k bits from M bits. M can be chosen to be more than 2 or 3 times larger than k, and as such, constructing tables by reusing bits can achieve similar search results to not reusing bits, for example when the number of hash tables is relatively small, for example about ten. Thus, multiple tables can be constructed without increasing the total amount of bits needed for each local feature.

As discussed above with reference to 110, one database image can include several matched local features, which can be examined to determine if they are geometrically consistent, that is, whether a valid geometric transformation can be established between the feature positions in the query image and the positions in the database image. The existence of a consistent geometric transformation between two images can indicate that the image indeed contains similar object(s). A fast geometry verification technique based on length ratio can be used, which can be up to hundreds of times faster than a "RANdom SAmple Consensus" (RANSAC) algorithm. The fast geometry verification technique can estimate the portion of matched features between query and reference images that share a consistent scale change, where a larger portion of matched features can yield a higher score for the candidate reference image.

A the query image $I_q$ and a database image $I_{db}$ can have m≥2 matched local features. For two features p and q in $I_q$, the matched features can be represented as p' and q', respectively, $I_{db}$. $x_p$ and $y_p$ can represent the (x, y) coordinate of local feature p in the image. A length ratio can be represented as the ratio of distance between p and q and distance between p' and q':

$$\frac{\|(x_{p'} - x_{q'})^2 + (y_{p'} - y_{q'})^2\|^{\frac{1}{2}}}{\|(x_p - x_q)^2 + (y_p - y_q)^2\|^{\frac{1}{2}}}.$$

There can be m matched local features and $C_m^2$ matched feature pairs, and thus $C_m^2$ ratio values between $I_q$ and $I_{db}$. Each ratio value i can be quantized to some bin a in a ratio value histogram. Ratio value i can be computed with local feature p, p' and q, q', and i's determination to bin j can be determined as $$v_{i,j} = \alpha^{(d_{pp'} + d_{qq'})}, \text{ if } j == a,$$

$$v_{i,j} = 0, \text{ otherwise.} \quad (5)$$

α can be a constant, which can be smaller than but close to 1, and $d_{pp'}$ and $d_{qq'}$ can be the hamming distances between p, p' and q, q' respectively. As such, the maximum value in the histogram can represent the geometry similarity score between two images, which can be represented as, $$S_g(I_q, I_{db}) = \max_j \sum_{i=1,\ldots,C_{\mu i}^2} v_{i,j}. \quad (6)$$

The similarity score in eq. (6) can result in an approximately quadratic growth versus the number of matched points. As such, the similarity score can more heavily weigh the number of matches while less heavily weighing the quality of matches themselves. Thus, one distracter image with a complex background can, for example, have a higher score than a more correct image due at least in part to more matches to the background clutter of query image. Accordingly, the robustness to noisy matches can be improved by dividing the maximum value in the histogram by the total number of matches.

As discussed above with respect to 112, to obtain boundary features, the boundaries can be extracted. Product objects can generally be considered to be the most salient regions in an image, and as such, the SaliencyCut algorithm can be applied to extract the boundaries automatically. Interactive segmentation can be implemented, for example using Grabcut on the mobile device, to further improve the segmentation accuracy for the query.

Figure 2:
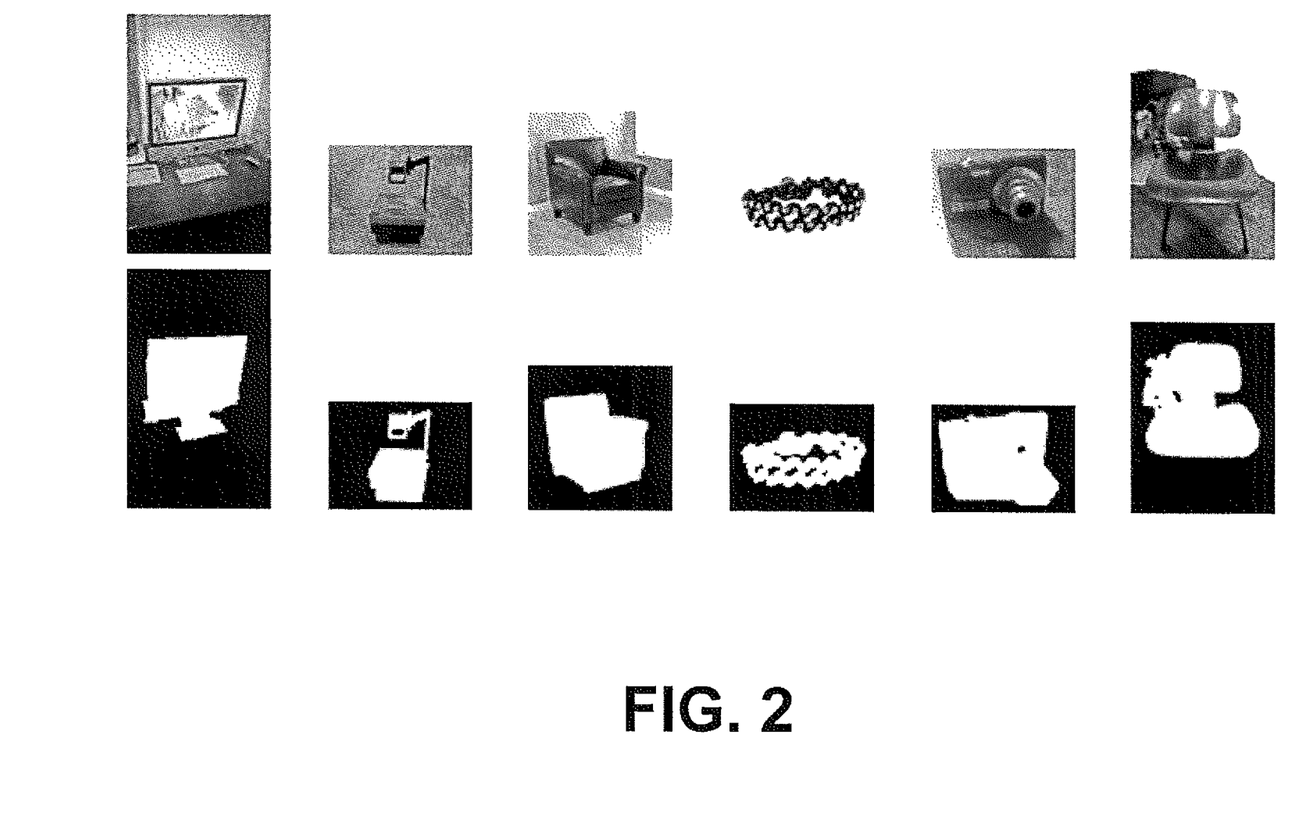
FIG. 2 is a diagram illustrating further details of boundary reranking according to the technique of FIG. 1.

FIG. 2 shows exemplary results of the automatic SaliencyCut. The first 4 images are segmented correctly, while the last two do not find a perfect cut due to at least in part to shadow, lighting, and/or distracting background.

Different boundary features can be utilized. In an exemplary embodiment, central distance can be utilized, and can be relatively simple and robust.

Before feature extraction, the boundary can be smoothed by using a moving average filter to eliminate noises on the boundary. The boundary feature can be represented as the distances between sampled points p(n) along the shape boundary and the shape center $c = (c_x, c_y)$:

$$D(n) = \frac{\|p(n) - c\|_2}{\max_n \|p(n) - c\|_2}, \quad (7)$$

$$n = 1, 2, \ldots, N$$

The points p(n) can be sampled with a fixed length along the boundary. For a desired feature length N, the sampling can be set to L/N, where L can represent the boundary length (i.e., the total number of pixels in the boundary curve). The central distance feature can be invariant to translation. In addition, the feature D can be normalized by its maximum element, and thus can be scale invariant.

Moreover, a discrete Fourier transform (DFT) can be applied to make the central distance feature rotation invariant and start point independent, and can be represented as $$F(n) = |f[D(n)]|, n = 1, 2, \ldots, N \quad (8)$$

where f[•] can represent the discrete Fourier transform and can be computed efficiently by fast Fourier transform (FFT) in linear time. A circular shift of the feature vector D(n) can affect the phases of its frequency signal, while F(n), the magnitude of frequency signal, can remain unchanged. As such, F(n) can be translation, scale, and rotation invariant to boundary changes.

Figure 3A:
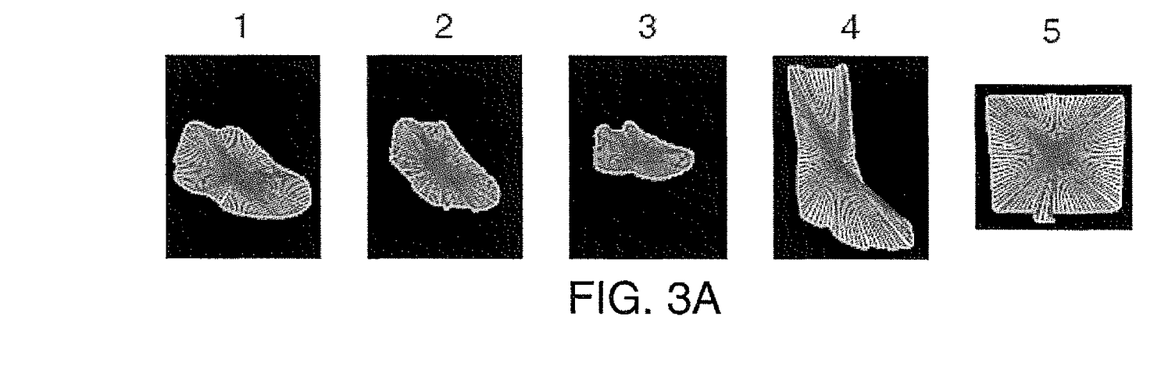
FIGS. 3A-3C are diagrams illustrating further details of boundary reranking according to the technique of FIG. 1.
Figure 3B:
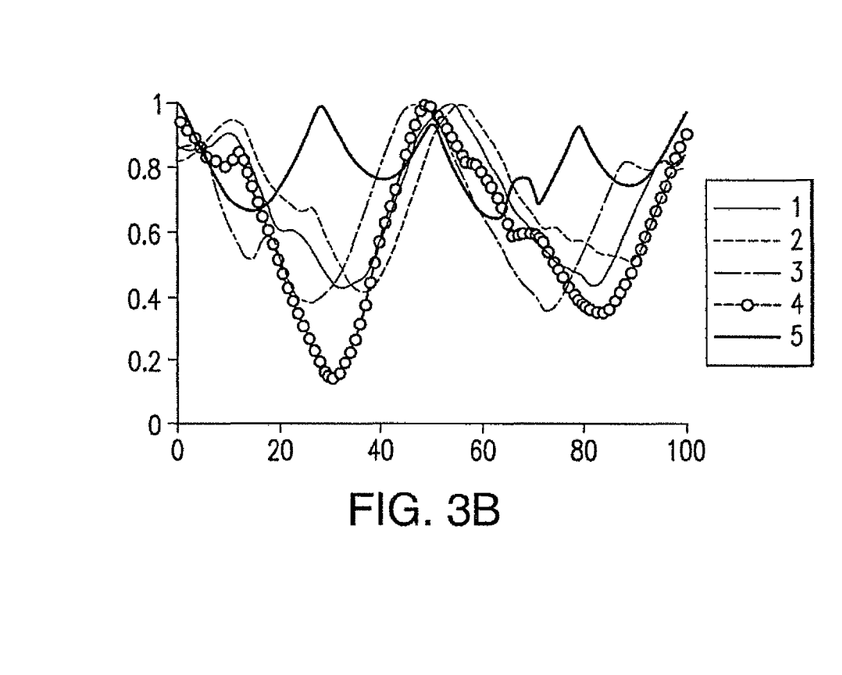
Figure 3C:
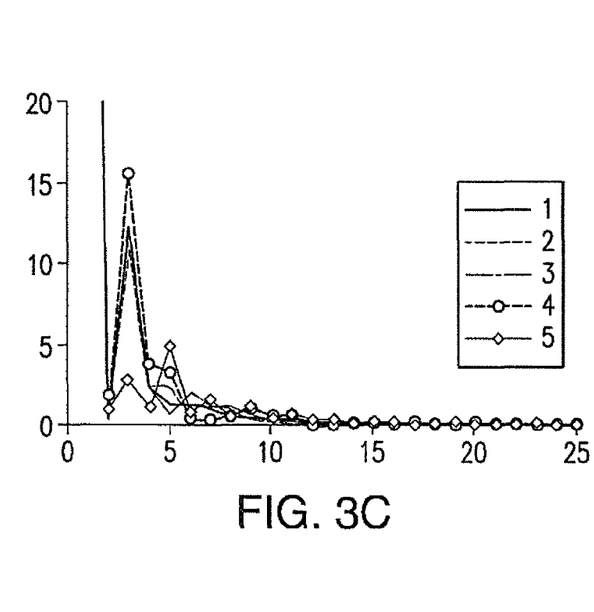

FIG. 3A shows 5 exemplary object boundaries extracted by the SaliencyCut algorithm. FIG. 3B is a diagram illustrating the central distance features for the 5 examples. FIG. 3C is a diagram illustrating the central distance features in frequency domain. As shown in FIGS. 3B and 3C, the similarity among the central distance features or their frequencies illustrate the similarity among boundaries.

For one query image $I_q$ and one database image $I_{db}$, their boundary similarity $S_b(I_q, I_{db})$ can be represented as $S_b(I_q, I_{db}) = e^{-\|F_q - F_{db}\|}$, where $F_q$ and $F_{db}$ can represent the frequency magnitude for $I_q$ and $I_{db}$, as in eq. (8).

The geometry similarity score $S_g$, as determined using eq. (6), and boundary similarity $S_b$, can be combined with a linear combination: $S(I_q, I_{db}) = S_g(I_q, I_{db}) + \lambda S_b(I_q, I_{db})$. The combined similarity s can be used to rerank the top results.

EXAMPLE

Video demonstrations of the end-to-end mobile product search system operational over actual mobile networks are available at http://www.ee.columbia.edu/dvmm/newDownloads.htm. The disclosed subject matter can provide mobile visual search having similar speeds in most stages of operations as other mobile visual search systems. For example, local feature extraction on a mobile device can be performed in less than 1 second, and transmitting query data through network can also typically be performed in less than 1 second. Compressing each local features to hash bits can be performed at improved speeds, which can be negligible compared to other operations.

Compared to other mobile visual search systems, which for example perform searching using other techniques, such as using BoW or CHoG, the disclosed subject matter performs searching using bag of hash bits (BoHB) to improve performance. Experiments can be performed on a workstation to provide comparative results of the disclosed subject matter compared to mobile visual search systems using other techniques. Both search accuracy and search time can be analyzed. The time of other stages (for example, feature extraction, transmission) can be independent of the database size, while the database size can affect performance of the searching technique. As such, the searching time can represent the scalability of a mobile visual search system.

Certain product or object image sets, for example the "Stanford Mobile Visual Data Set" or "UKBench" object data set, can have a relatively small scale, on the order of thousands of images and can contain mainly 2D objects like CD/DVD/Book covers.

For mobile product search applications, an improved data set can be obtained from online shopping companies, such as Amazon, Ebay, etc. In one example, two large scale product sets from Amazon, Zappos, and Ebay were collected, including 300,000-400,000 images of product objects, from diverse categories like shoes, clothes, groceries, electrical devices, etc.

The first data set included 360,000 product images obtained from Amazon.com, including about 15 categories of products. For this data set, a query set of 135 product images was created. Each query image had one groundtruth image in the database, which contained the same product as the query, but differed in object size, orientation, background, lighting, camera, etc.

The second data set contained 400,000 product images collected from multiple sources, for example from Ebay.com, Zappos.com, Amazon.com, etc, and included hundreds of categories. For this data set, a query set of 205 product images was created.

The image sizes for both sets were typically on the order of 200-400 pixels by 200-400 pixels. Each image typically included about 50-500 SURF features. No subwindow was provided for each query image, and the boundaries for product objects in both database and queries were extracted by automatic SaliencyCut.

Figure 4:
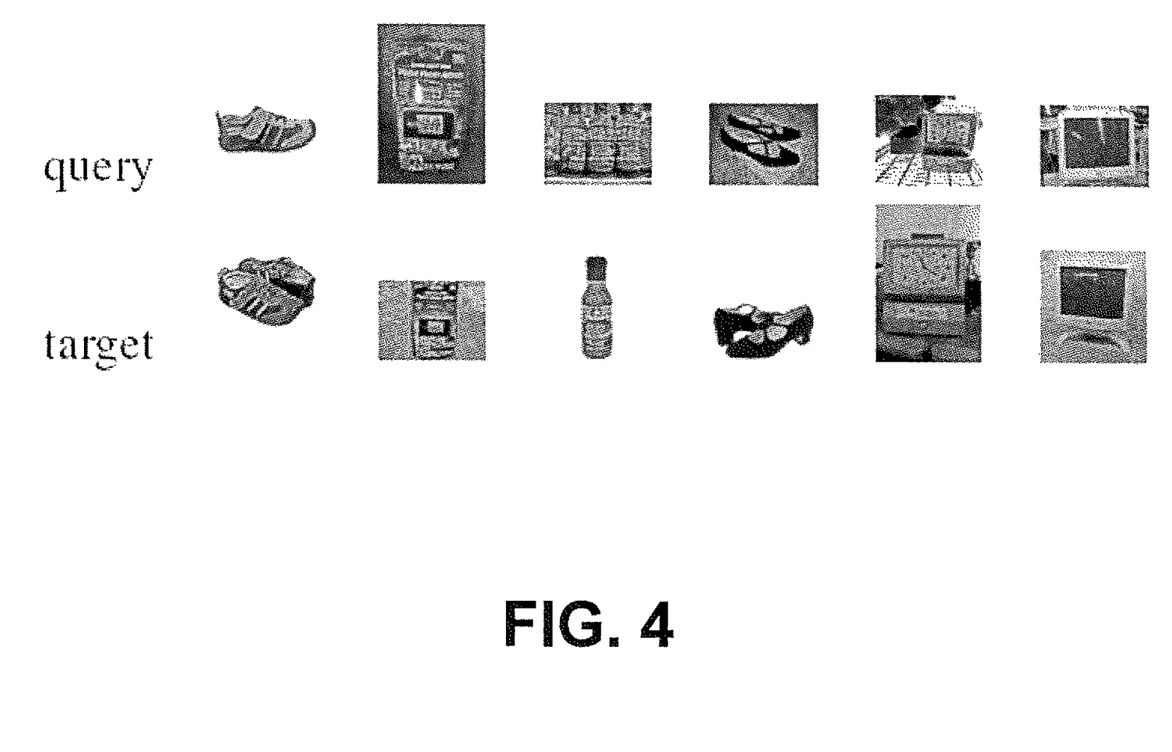
FIG. 4 is a diagram illustrating exemplary queries according to the disclosed subject matter.

Some examples of the query images and the corresponding groundtruth images from our data sets are shown in FIG. 4. The first row are the query images, and the second row are the corresponding groundtruth images.

First, the disclosed subject matter was compared to a mobile product search system using a CHoG approach. In the CHoG implementation, each CHoG feature was about 80 bits. The CHoG features were quantized with vocabulary tree. The quantization for CHoG approach was done on the server side, and thus a large scale codebook having 1 million words was used.

In the example according to the disclosed subject matter, 80 bits were used for each local feature by using SPICA hashing or locality-sensitive hashing (LSH). 12 hash tables were built, each of which was constructed by randomly choosing 32 bits from the 80 bits. Groups within hamming distance r in each hash table were checked, with r set to 1-3.

Figure 5:
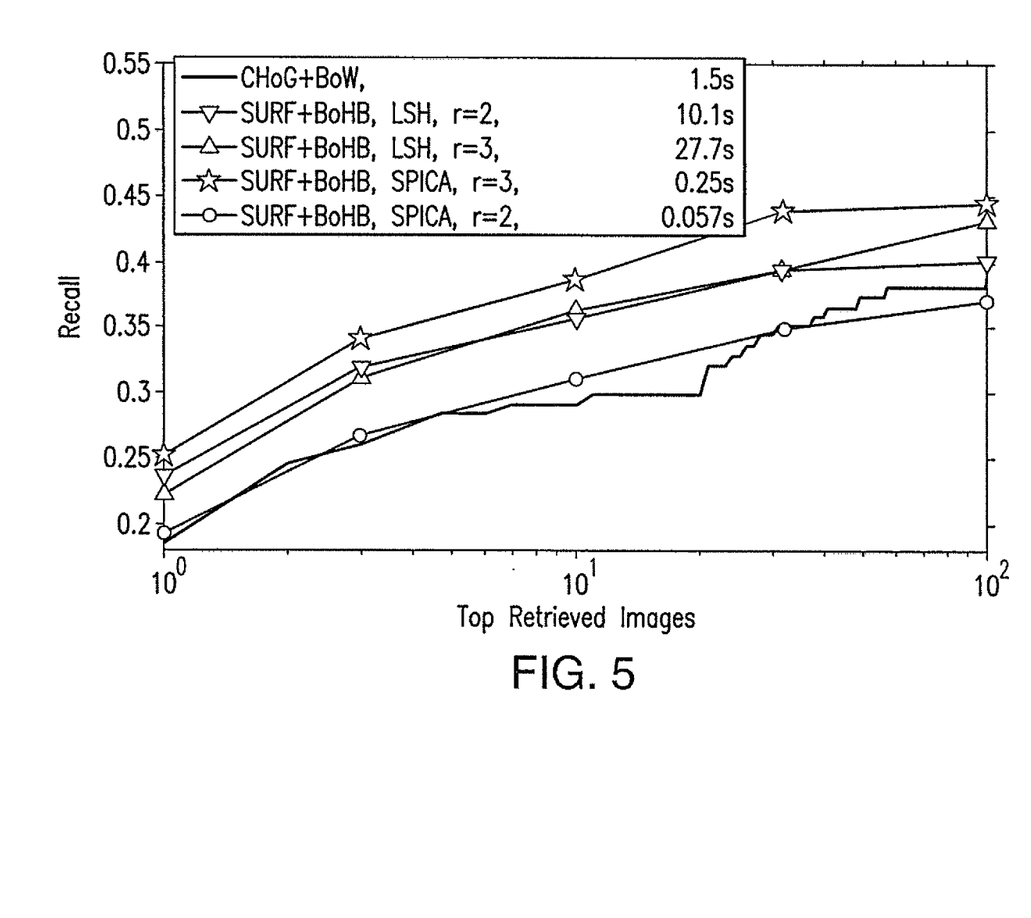
FIG. 5 is a diagram illustrating further details of the technique of FIG. 1.

As shown in FIG. 5, with bits generated from SPICA hashing and hamming distance r=2, the disclosed subject matter can obtain similar recall as BoW on "CHoG" features, but the search speed was improved by orders of magnitude. With a setting of r=3, the accuracy was improved, for example about 30% improvement for the recall of the top 10 retrieved results, and was performed several times faster.

Using bits from LSH, in the exemplary embodiment of the disclosed subject matter, the search time was increased by tens to hundreds of times. This can be due at least in part because LSH bits can be randomly generated, and thus can be redundant.

The exemplary embodiment of the disclosed subject matter was also compared to other visual search systems, such as BoW using vocabulary tree or product quantization, with SURF features.

Figure 6:
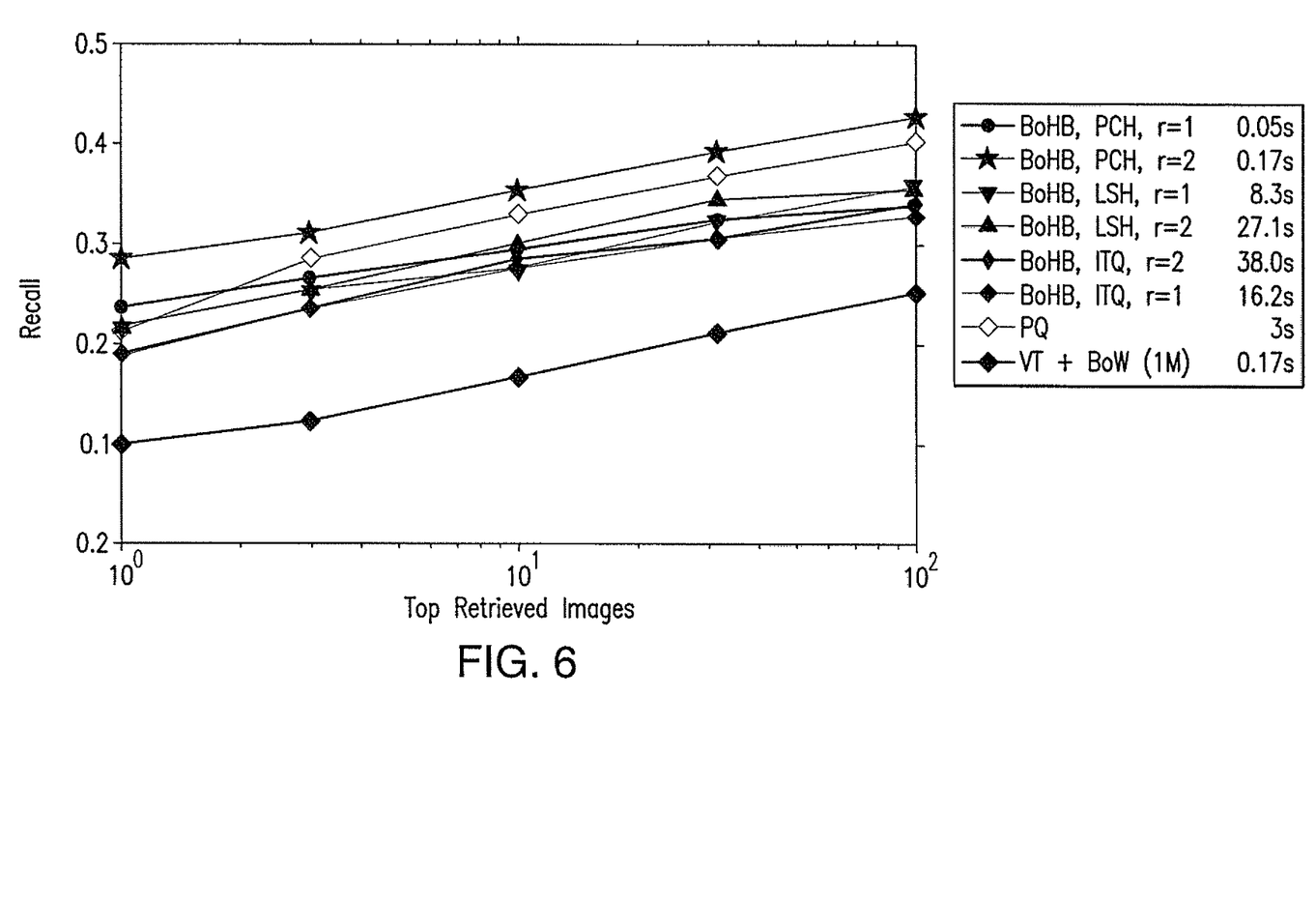
FIG. 6 is a diagram illustrating further details of the technique of FIG. 1.

For the vocabulary tree implementation, the codebook size on SURF features was up to 1M million. As shown in FIG. 6, with bits generated from PCA hashing (PCH), and hamming distance r=1 or 2, the exemplary embodiment of the disclosed subject matter achieved 2-3 fold increase in terms of recall over the vocabulary tree implementation. For the product quantization implementation, product quantization was used to match top K nearest neighbor local features for each query local feature, and then the candidate database images were reranked. In this implementation, K=1000, and reranking was based on the counts of matched local features in each candidate images. The product quantization technique achieved slightly lower accuracy than the exemplary embodiment of the disclosed subject matter, and with a slower search speed. Using LSH or ITQ hash bits, the search time of the exemplary embodiment of the disclosed subject matter increased.

Figure 7:
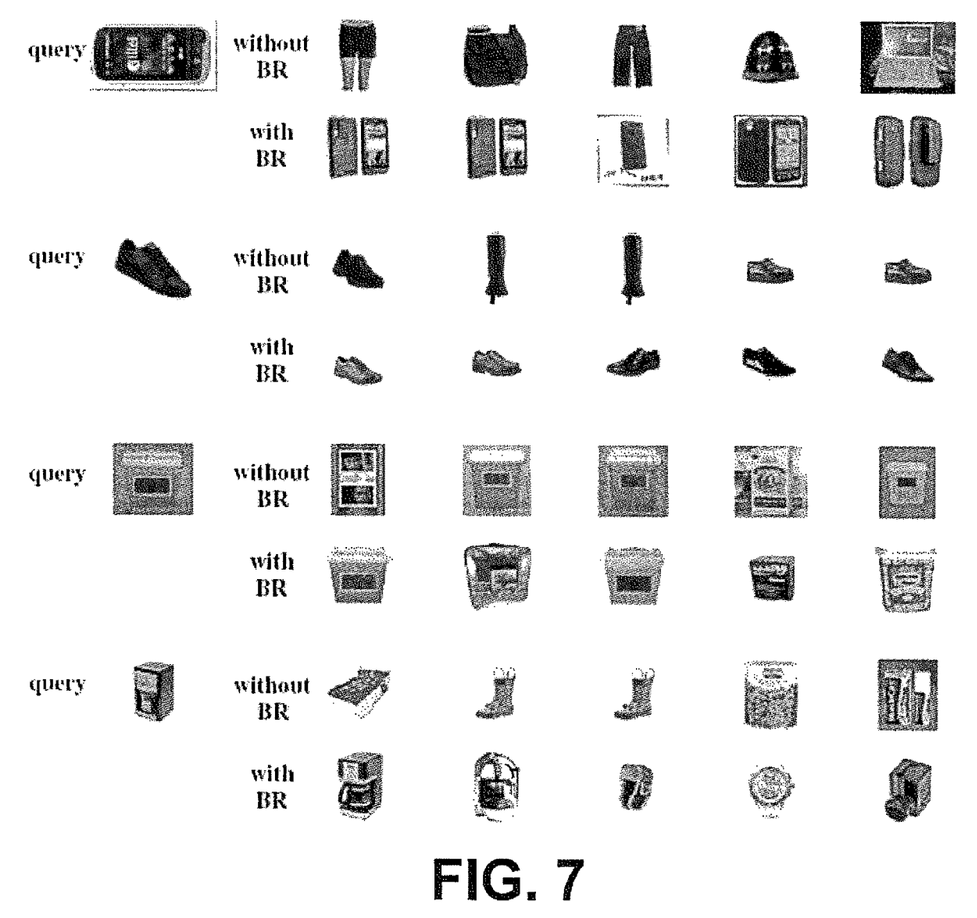
FIG. 7 is a diagram illustrating exemplary queries and search results according to the disclosed subject matter.

Utilizing the exemplary embodiment of the disclosed subject matter with SPICA or PCH bits and r=3 was also performed, as in FIG. 5, but also configured to include boundary reranking. The recall of top 100 results achieved about 8%-10% improvement compared to without boundary reranking. This can be due at least in part to the experimental definition of the groundtruth images, as for each query, only one groundtruth image was defined. Some exemplary search results with and without boundary reranking (BR) are shown in FIG. 7. As shown in FIG. 7, boundary reranking can filter out noisy results and improve the search quality, including increasing the number of relevant products. Boundary reranking can also improve results when the query product does not exist in the database, and thus relevant or similar products can still be returned.

Figure 8:
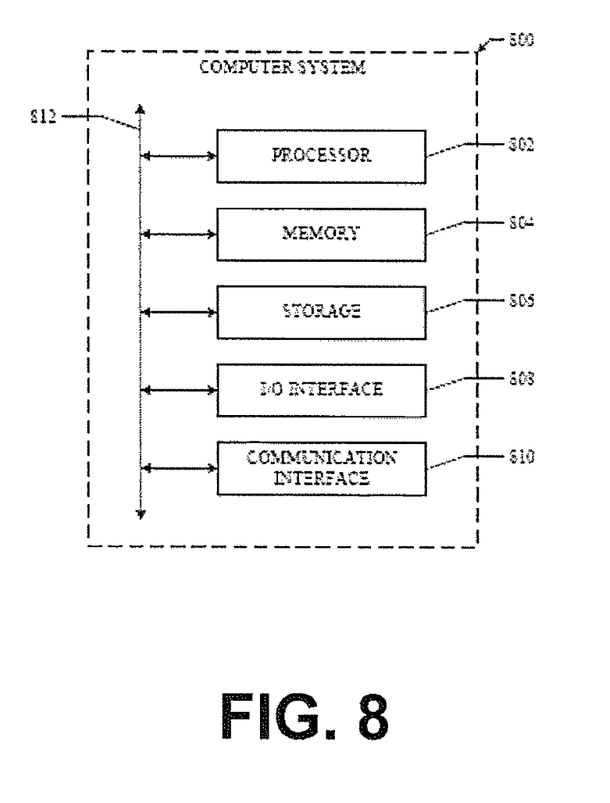
FIG. 8 is a diagram illustrating an exemplary computer system according to the disclosed subject matter.

As described above in connection with certain embodiments, a computer system 800 is provided to perform, among other features, matching query features with image features of an image database, determining candidate images whose number of matched features exceeds a matched feature threshold, generating a geometry similarity score between the query image and each of the candidate images using the feature data and the coordinate data, generating a boundary similarity score between the query image and each of the candidate images using the boundary data, and ranking the candidate images based on the numbers of matched features, the geometry similarity scores and the boundary similarity scores. In these embodiments, the computer system 800 plays a significant role in permitting the disclosed technique to provide mobile visual search. For example, the computer system 800 can return candidate images in response to image query data generated at a mobile client device corresponding to a query image.

FIG. 8 illustrates an example computer system 800. In some embodiments, one or more computer systems 800 perform one or more procedures of one or more methods described or illustrated herein. In some embodiments, one or more computer systems 800 provide functionality described or illustrated herein. In some embodiments, software running on one or more computer systems 800 performs one or more of the methods described or illustrated herein or provides functionality described or illustrated herein. Some embodiments include one or more portions of one or more computer systems 800. Herein, reference to a computer system can encompass a computing device, and vice versa, where appropriate. Moreover, reference to a computer system can encompass one or more computer systems, where appropriate.

This disclosure contemplates any suitable number of computer systems 800. This disclosure contemplates computer system 800 taking any suitable physical form. As example and not by way of limitation, computer system 800 can be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 can include one or more computer systems 800; be unitary or distributed; span multiple locations; span multiple machines; span multiple data centers; or reside in a cloud, which can include one or more cloud components in one or more networks. Where appropriate, one or more computer systems 800 can perform without substantial spatial or temporal limitation one or more methods described or illustrated herein. As an example and not by way of limitation, one or more computer systems 800 can perform in real time or in batch mode one or more methods described or illustrated herein. One or more computer systems 800 can perform at different times or at different locations one or more methods described or illustrated herein, where appropriate.

In some embodiments, computer system 800 includes a processor 802, memory 804, storage 806, an input/output (I/O) interface 808, a communication interface 810, and a bus 812. Although this disclosure describes and illustrates a some computer system having a some number of some components in a some arrangement, this disclosure contemplates any suitable computer system having any suitable number of any suitable components in any suitable arrangement.

In some embodiments, processor 802 includes hardware for executing instructions, such as those making up a computer program. As an example and not by way of limitation, to execute instructions, processor 802 can retrieve (or fetch) the instructions from an internal register, an internal cache, memory 804, or storage 806; decode and execute them; and then write one or more results to an internal register, an internal cache, memory 804, or storage 806. In some embodiments, processor 802 can include one or more internal caches for data, instructions, or addresses. This disclosure contemplates processor 802 including any suitable number of any suitable internal caches, where appropriate. As an example and not by way of limitation, processor 802 can include one or more instruction caches, one or more data caches, and one or more translation lookaside buffers (TLBs). Instructions in the instruction caches can be copies of instructions in memory 804 or storage 806, and the instruction caches can speed up retrieval of those instructions by processor 802. Data in the data caches can be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches can speed up read or write operations by processor 802. The TLBs can speed up virtual-address translation for processor 802. In some embodiments, processor 802 can include one or more internal registers for data, instructions, or addresses. This disclosure contemplates processor 802 including any suitable number of any suitable internal registers, where appropriate. Where appropriate, processor 802 can include one or more arithmetic logic units (ALUs); be a multi-core processor; or include one or more processors 802. Although this disclosure describes and illustrates a some processor, this disclosure contemplates any suitable processor.

In some embodiments, memory 804 includes main memory for storing instructions for processor 802 to execute or data for processor 802 to operate on. As an example and not by way of limitation, computer system 800 can load instructions from storage 806 or another source (such as, for example, another computer system 800) to memory 804. Processor 802 can then load the instructions from memory 804 to an internal register or internal cache. To execute the instructions, processor 802 can retrieve the instructions from the internal register or internal cache and decode them. During or after execution of the instructions, processor 802 can write one or more results (which can be intermediate or final results) to the internal register or internal cache. Processor 802 can then write one or more of those results to memory 804. In some embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which can each include an address bus and a data bus) can couple processor 802 to memory 804. Bus 812 can include one or more memory buses, as described below. In some embodiments, one or more memory management units (MMUs) reside between processor 802 and memory 804 and facilitate accesses to memory 804 requested by processor 802. In some embodiments, memory 804 includes random access memory (RAM). This RAM can be volatile memory, where appropriate. Where appropriate, this RAM can be dynamic RAM (DRAM) or static RAM (SRAM). Moreover, where appropriate, this RAM can be single-ported or multi-ported RAM. This disclosure contemplates any suitable RAM. Memory 804 can include one or more memories 804, where appropriate. Although this disclosure describes and illustrates some memory, this disclosure contemplates any suitable memory.

In some embodiments, storage 806 includes mass storage for data or instructions. As an example and not by way of limitation, storage 806 can include a hard disk drive (HDD), a floppy disk drive, flash memory, an optical disc, a magneto-optical disc, magnetic tape, or a Universal Serial Bus (USB) drive or a combination of two or more of these. Storage 806 can include removable or non-removable (or fixed) media, where appropriate. Storage 806 can be internal or external to computer system 800, where appropriate. In some embodiments, storage 806 is non-volatile, solid-state memory. In some embodiments, storage 806 includes read-only memory (ROM). Where appropriate, this ROM can be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 can include one or more storage control units facilitating communication between processor 802 and storage 806, where appropriate. Where appropriate, storage 806 can include one or more storages 806. Although this disclosure describes and illustrates some storage, this disclosure contemplates any suitable storage.

In some embodiments, I/O interface 808 includes hardware, software, or both, providing one or more interfaces for communication between computer system 800 and one or more I/O devices. Computer system 800 can include one or more of these I/O devices, where appropriate. One or more of these I/O devices can enable communication between a person and computer system 800. As an example and not by way of limitation, an I/O device can include a keyboard, keypad, microphone, monitor, mouse, printer, scanner, speaker, still camera, stylus, tablet, touch screen, trackball, video camera, another suitable I/O device or a combination of two or more of these. An I/O device can further include one or more sensors. This disclosure contemplates any suitable I/O devices and any suitable I/O interfaces 808 for them. Where appropriate, I/O interface 808 can include one or more device or software drivers enabling processor 802 to drive one or more of these I/O devices. I/O interface 808 can include one or more I/O interfaces 808, where appropriate. Although this disclosure describes and illustrates a some I/O interface, this disclosure contemplates any suitable I/O interface.

In some embodiments, communication interface 810 includes hardware, software, or both providing one or more interfaces for communication (such as, for example, packetbased communication) between computer system 800 and one or more other computer systems 800 or one or more networks. As an example and not by way of limitation, communication interface 810 can include a network interface controller (NTC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 can communicate with an ad hoc network, a personal area network (PAN), a local area network (LAN), a wide area network (WAN), a metropolitan area network (MAN), or one or more portions of the Internet or a combination of two or more of these. One or more portions of one or more of these networks can be wired or wireless. As an example, computer system 800 can communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 can include any suitable communication interface 810 for any of these networks, where appropriate. Communication interface 810 can include one or more communication interfaces 810, where appropriate. Although this disclosure describes and illustrates a some communication interface, this disclosure contemplates any suitable communication interface.

In some embodiments, bus 812 includes hardware, software, or both coupling components of computer system 800 to each other. As an example and not by way of limitation, bus 812 can include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 can include one or more buses 812, where appropriate. Although this disclosure describes and illustrates a some bus, this disclosure contemplates any suitable bus or interconnect.

Herein, a computer-readable non-transitory storage medium or media can include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium can be volatile, non-volatile, or a combination of volatile and non-volatile, where appropriate.

While the disclosed subject matter is described herein in terms of certain exemplary embodiments, those skilled in the art will recognize that various modifications and improvements can be made to the disclosed subject matter without departing from the scope thereof.

The foregoing merely illustrates the principles of the disclosed subject matter. Various modifications and alterations to the described embodiments will be apparent to those skilled in the art in view of the teachings herein. It will be appreciated that those skilled in the art will be able to devise numerous modifications which, although not explicitly described herein, embody its principles and are thus within its spirit and scope.

The invention claimed is:

1. A method for determining one or more ranked candidate media in response to media query data generated at a mobile client device corresponding to a query media, comprising:
   receiving the media query data from the mobile client device, the media query data comprising feature data of one or more features of the query media encoded by one or more similarity preserving hashing functions into a plurality of hash bits and coordinate data for each of the one or more features;
   matching, on a server computer system, the one or more of the features of the query media with one or more corresponding features of a media database using the feature data of the query media to identify one or more features of the media database within a predetermined hamming distance in one or more hash tables from the one or more corresponding features of the query media to obtain one or more matched features in the media database, the features of the query media and the features of the media database each being assigned to one of a plurality of entries of the one or more hash tables using the plurality of hash bits as table indexes;
   determining, on the server computer system, one or more candidate media whose number of matched features exceeds a matched feature threshold;
   generating, on the server computer system, a geometry similarity score between the query media and each of the one or more candidate media using the feature data and the coordinate data;
   ranking, on the server computer system, the one or more candidate media based on the numbers of matched features and the geometry similarity score; and
   sending the ranked candidate media to the mobile client device.

2. The method of claim 1, wherein the media query data further comprises boundary data, the method further comprising generating, on the server computer system, a boundary similarity score between the query media and each of the one or more candidate media using the boundary data, and ranking the one or more candidate media is further based on the boundary similarity score.

3. The method of claim 1, wherein the query media comprises a query image.

4. The method of claim 1, wherein the similarity preserving hashing function comprises a linear hashing function.

5. The method of claim 1, wherein the similarity preserving hashing function comprises a nonlinear hashing function.

6. The method of claim 1, wherein the plurality of hash bits is limited to less than 100 bits.

7. The method of claim 1, wherein matching the one or more features comprises identifying table entries within the predetermined hamming distance from the entries containing the features of the query media.

8. The method of claim 1, further comprising:
   obtaining a plurality of subgroups of the plurality hash bits of each feature data,
   utilizing each of the plurality of subgroups to create the one or more hash tables, and
   assigning the feature data to an entry of a corresponding hash table.

9. The method of claim 1, wherein generating the geometry similarity score comprises determining a length ratio between the one or more features of the query media and corresponding matched features of the candidate media using the coordinate data.

10. The method of claim 1, wherein generating the boundary similarity score comprises:
for each media of the query media and the candidate media,
sampling a plurality of points along the boundary of the media,
determining a distance between each sampled point and the center of the media to obtain boundary distance data, and
applying a Fourier transform to the boundary distance data to obtain frequency magnitudes; and
comparing the frequency magnitudes of the query media with the frequency magnitudes of the candidate media.

11. The method of claim 1, wherein ranking the one or more candidate media comprises:
ranking the candidate media by the number of matched features,
for each of the one or more candidate media, combining the geometry similarity score and the boundary similarity score, and
reranking the candidate media using the combined score.

12. One or more computing devices associated with a server computing system for determining one or more ranked candidate media in response to media query data generated at a mobile client device corresponding to a query media, the computing devices comprising:
one or more processors; and
one or more computer-readable non-transitory storage media embodying software that is configured when executed by one or more of the processors to:
receive the media query data from the mobile device, the media query data comprising feature data of one or more features of a query media encoded by a similarity preserving hashing function into a plurality of hash bits and coordinate data for each of the one or more features;
match the one or more of the features with one or more corresponding features of an media database using the feature data to identify one or more features of the query media within a predetermined hamming distance in a hash table from the one or more corresponding features of the media database to obtain one or more matched features in the media database, the features of the query media and the features of the media database each being assigned to one of a plurality of entries of the one or more hash tables using the plurality of hash bits as table indexes;
determine one or more candidate media whose number of matched features exceed a matched feature threshold;
generate a geometry similarity score between the query media and each of the one or more candidate media using the feature data and the coordinate data;
rank the one or more candidate media based on the numbers of matched features and the geometry similarity score; and
send the ranked candidate media to the mobile client device.

13. The computing devices of claim 12, wherein the media query data further comprises boundary data, the software being further configured to generate a boundary similarity score between the query media and each of the one or more candidate media using the boundary data, and the one or more candidate media is ranked further based on the boundary similarity score.

14. The computing devices of claim 12, wherein the query media comprises a query image.

15. The computing devices of claim 12, wherein the similarity preserving hashing function comprises a linear hashing function.

16. The computing devices of claim 12, wherein the similarity preserving hashing function comprises a nonlinear hashing function.

17. The computing devices of claim 12, wherein the plurality of hash bits is limited to less than 100 bits.

18. The computing devices of claim 12, wherein matching the one or more features comprises identifying table entries within the predetermined hamming distance from the entries containing the features of the query media.

19. The computing devices of claim 12, wherein the software is further configured to:
obtain a plurality of subgroups of the plurality hash bits of each feature data,
utilize each of the plurality of subgroups to create the one or more hash tables, and
assign the feature data to an entry of a corresponding hash table.

20. The computing devices of claim 12, wherein the software is further configured to generate the geometry similarity score by determining a length ratio between the one or more features of the query media and corresponding matched features of the candidate media using the coordinate data.

21. The computing devices of claim 12, wherein the software is further configured to generate the boundary similarity score by:
for each media of the query media and the candidate media,
sampling a plurality of points along the boundary of the media,
determining a distance between each sampled point and the center of the media to obtain boundary distance data, and
applying a Fourier transform to the boundary distance data to obtain frequency magnitudes; and
comparing the frequency magnitudes of the query media with the frequency magnitudes of the candidate media.

22. The computing devices of claim 12, wherein the software is further configured to rank the one or more candidate media by:
ranking the candidate media by the number of matched features,
for each of the one or more candidate media, combining the geometry similarity score and the boundary similarity score, and
reranking the candidate media using the combined score.

23. One or more computer-readable non-transitory storage media embodying software for determining one or more ranked candidate media in response to media query data generated at a mobile client device corresponding to a query media that is configured when executed to:
receive the media query data from the mobile device, the media query data comprising feature data of one or more features of a query media encoded by a similarity preserving hashing function into a plurality of hash bits and coordinate data for each of the one or more features;
match the one or more of the features with one or more corresponding features of an media database using the feature data to identify one or more features of the query media within a predetermined hamming distance in a hash table from the one or more corresponding features of the media database to obtain one or more matched features in the media database, the features of the query media and the features of the media database each being assigned to one of a plurality of entries of the one or more hash tables using the plurality of hash bits as table indexes;

determine one or more candidate media whose number of matched features exceed a matched feature threshold;

generate a geometry similarity score between the query media and each of the one or more candidate media using the feature data and the coordinate data;

rank the one or more candidate media based on the numbers of matched features and the geometry similarity score; and send the ranked candidate media to the mobile client device.

24. The storage media of claim 2, wherein the media query data further comprises boundary data, the software being further configured to generate a boundary similarity score between the query media and each of the one or more candidate media using the boundary data, and the one or more candidate media is ranked further based on the boundary similarity score.

25. The storage media of claim 2, wherein the query media comprises a query image.

* * * * *